United States Patent
Harrington et al.

(10) Patent No.: US 10,916,025 B2
(45) Date of Patent: Feb. 9, 2021

(54) SYSTEMS AND METHODS FOR FORMING MODELS OF THREE-DIMENSIONAL OBJECTS

(71) Applicant: Fuel 3D Technologies Limited, Chinnor (GB)

(72) Inventors: Marian Elizabeth Harrington, Witney (GB); Leonardo Rubio Navarro, Oxford (GB)

(73) Assignee: FUEL 3D TECHNOLOGIES LIMITED, Oxfordshire (GB)

( * ) Notice: Subject to any disclaimer, the term of this patent is extended or adjusted under 35 U.S.C. 154(b) by 156 days.

(21) Appl. No.: 15/773,484

(22) PCT Filed: Oct. 31, 2016

(86) PCT No.: PCT/GB2016/053367
§ 371 (c)(1),
(2) Date: May 3, 2018

(87) PCT Pub. No.: WO2017/077276
PCT Pub. Date: May 11, 2017

(65) Prior Publication Data
US 2018/0322647 A1    Nov. 8, 2018

(30) Foreign Application Priority Data
Nov. 3, 2015   (GB) .................................. 1519397.2

(51) Int. Cl.
*G06T 7/586*        (2017.01)
*G06T 17/00*        (2006.01)
(Continued)

(52) U.S. Cl.
CPC .............. *G06T 7/586* (2017.01); *G06T 7/593* (2017.01); *G06T 7/596* (2017.01); *G06T 17/00* (2013.01);
(Continued)

(58) Field of Classification Search
CPC combination set(s) only.
See application file for complete search history.

(56) References Cited

U.S. PATENT DOCUMENTS 5,831,621 A * 11/1998 Pito ........................ G01B 11/24
                                                               345/419
6,639,594 B2 * 10/2003 Zhang ................... G06T 15/506
                                                               345/426
(Continued)

FOREIGN PATENT DOCUMENTS

| EP | 2024707 B1 | 11/2011 |
| GB | 2453163 A | 4/2009 |
| WO | WO2009122200 A1 | 8/2009 |

OTHER PUBLICATIONS

Wu, et al. "Fusing Multiview and Photometric Stereo for 3D Reconstruction under Uncalibrated Illumination", IEEE Transactions on Visualization and Computer Graphics, vol. 17, No. 8, Aug. 2011.
(Continued)

*Primary Examiner* — Zhiyu Lu
(74) *Attorney, Agent, or Firm* — Thomas Horstemeyer, LLP

(57) ABSTRACT

A 3D imaging system is proposed in which an object is successively illuminated in at least three directions and at least three images of the object are captured by one or more energy sensors. A set of images is produced computationally showing the object from multiple viewpoints, and illuminated in the at least three directions simultaneously. This set of images is used stereoscopically to form an initial 3D model of the object. Variations in the brightness of the object provides features useful in the stereoscopy. The initial model is refined using photometric data obtained from images in which the object is illuminated in the at least three directions successively.

10 Claims, 6 Drawing Sheets

(51) Int. Cl.
  *G06T 7/593* (2017.01)
  *G06T 19/00* (2011.01)
(52) U.S. Cl.
  CPC .......... *G06T 19/00* (2013.01); *G06T 2200/08* (2013.01); *G06T 2207/10012* (2013.01); *G06T 2207/10152* (2013.01)

(56) References Cited

U.S. PATENT DOCUMENTS

| | | | | |
|---|---|---|---|---|
| 6,750,873 | B1* | 6/2004 | Bernardini | G06T 15/04 345/581 |
| 9,268,147 | B2* | 2/2016 | Huang | G02B 30/26 |
| 10,068,344 | B2* | 9/2018 | Jovanovich | G06T 7/579 |
| 2009/0080036 | A1* | 3/2009 | Paterson | G01B 11/2518 358/474 |
| 2009/0232355 | A1* | 9/2009 | Minear | G06T 7/35 382/103 |
| 2011/0279303 | A1* | 11/2011 | Smith, Jr. | G01S 13/867 342/52 |
| 2012/0176380 | A1* | 7/2012 | Wang | G01B 11/2545 345/420 |
| 2012/0287247 | A1 | 11/2012 | Stenger | |
| 2013/0266238 | A1* | 10/2013 | Jin | G06K 9/4652 382/254 |
| 2015/0062120 | A1* | 3/2015 | Reisner-Kollmann | G06T 19/006 345/419 |

OTHER PUBLICATIONS

GB1519397.2 foreign search report dated Apr. 1, 2016.
Jongwoo, et al., "Passive Photometric Stereo from Motion", Computer Vision, 2005, ICCV, 2005, 10th IEEE International Conference on Beijing China, Oct. 17-20, 2005.

* cited by examiner

SYSTEMS AND METHODS FOR FORMING MODELS OF THREE-DIMENSIONAL OBJECTS

CROSS-REFERENCE TO RELATED APPLICATION

This application is the 35 U.S.C. § 371 national stage application of PCT Application No. PCT/GB2016/053367, filed Oct. 31, 2016, where the PCT claims priority to and the benefit of, GB Patent Application No. 1519397.2, filed Nov. 3, 2015, both of which are herein incorporated by reference in their entireties.

SUMMARY OF THE INVENTION

The present invention relates to an imaging system for generating three-dimensional (3D) images of a 3D object, and a method performed by the imaging system. In particular it relates to situations in which the object contains few landmarks which can be used to assist the imaging process, for example because the object is monochrome.

BACKGROUND OF THE INVENTION

Modelling of 3D surfaces using two-dimensional images has been a major research topic for many years. The 3D surface is illuminated by light (or other electromagnetic radiation), and the two-dimensional images are created using the light reflected from it.

Most real objects exhibit two forms of reflectance: specular reflection (particularly exhibited by glass or polished metal) in which, if incident light (visible light or other electromagnetic radiation) strikes the surface of the object in a single direction, the reflected radiation propagates in a very narrow range of angles; and Lambertian reflection (exhibited by diffuse surfaces, such as matte white paint) in which the reflected radiation is isotropic with an intensity according to Lambert's cosine law (an intensity directly proportional to the cosine of the angle between the direction of the incident light and the surface normal). Most real objects have some mixture of Lambertian and specular reflective properties.

Recently, great progress has been made in imaging three-dimensional surfaces which exhibit Lambertian reflective properties by means of photometry (the science of measuring the brightness of light). For example, WO 2009/122200, "3D Imaging System" describes a system in which, in preferred embodiments, the object is successively illuminated by at least three directional light sources, and multiple cameras at spatially separated positions capture images of the object. If the object is expected to move relative to the imaging system during the imaging process, a localization template, fixed to the object, is provided in the optical fields of all the light sensors, to allow the images to be registered with each other, in a frame of reference in which the object is unmoving.

Typically, the object will have a number of "landmarks" which, when imaged, produce features which can be recognized in each of the images. Consider two images (a "stereo pair" of images) which are captured simultaneously respectively by two or more of the cameras which have known relative positions. For each of a number of landmarks (such as marks on the surface, or places where there is a color transition), the system determines the corresponding positions in the stereo pair of images of the corresponding features. Using this data, an initial 3D model of the object is created stereoscopically (i.e. by optical triangulation).

Photometric data is generated from images captured at successive respective times when the respective light sources are activated. If the object is moving relative to the cameras during this period, the images are registered using the localization template (i.e. such that the respective viewpoints are known in a common reference frame in which the object is stationary). On the assumption that the object exhibits Lambertian reflection, the photometric data makes it possible to obtain an estimate of the normal direction to the surface of the object with a resolution comparable to individual pixels of the image. The normal directions are then used to refine the initial model of the 3D object.

Problems may arise if one or more of the directional light sources are positioned such that part of the object is in shadow, since this causes well-known problems for photometry. Similarly, it is desirable for stereoscopy if the whole surface of the object is well lit, since in darker regions features of the object will not be easily visible. The stereoscopic model will generally be most accurate in the portions of the model corresponding to the well-lit areas of the object. For that reason, stereoscopy is often performed using lights very close to the camera, so that all areas of the object which are visible to the camera are well-lit ("bright field imaging"). Alternatively, the object may be lit by diffuse light, thereby minimizing shadows, and ensuring that all sides of the object are well lit. This makes it possible to produce a high quality 3D model of the object, though of course there is an additional cost in providing both the directional light sources and the diffuse light source.

Unfortunately, if the object is monochrome and without surface markings, it may be hard to identify features in the stereo pair of images. In this case, the initial 3D model of the object may be inaccurate, leading to inaccuracy in the final 3D image.

SUMMARY OF THE INVENTION

The present invention aims to provide new and useful methods and systems for obtaining three-dimensional (3D) models of a 3D object, and optionally displaying images of the models.

In general terms, the invention proposes that, in a 3D imaging system in which an object is illuminated in at least three directions (preferably successively) and at least three corresponding images of the object are captured by one or more energy sensors ("single-direction" images). A pair of the images captured at different respective imaging locations (viewpoints) in which the object is illuminated by from the same direction are referred to as a "single-direction" stereo pair. A stereo pair of images is formed computationally in which the object is illuminated in multiple ones of the directions simultaneously (preferably in all three directions). This stereo pair of images (referred to below as a "combined-direction" stereo pair of images) is used for form an initial 3D model of the object, which is refined using photometric data obtained from images in which the object is illuminated in individual ones of the directions.

As mentioned above, the object is preferably illuminated successively in individual ones of the at least three directions. If this is done, the energy sources may emit light of the same frequency spectrum (e.g. if the energy is visible light, the directional light sources may each emit white light, and the captured images may be color images). However, in principle, the object could alternatively be illuminated in at least three directions by energy sources which emit energy with different respective frequency spectra (e.g. in the case of visible light, the directional light sources may respectively emit red, white and blue light). In this case, the directional energy sources could be activated simultaneously, if the energy sensors are able to distinguish the energy spectra. For example, the energy sensors might be adapted to record received red, green and blue light separately. That is, the red, green and blue light channels of the captured images would be captured simultaneously, and would respectively constitute the single direction images. However, this second possibility is not preferred, because coloration of the object may lead to incorrect photometric imaging.

The purpose of arranging that the stereo pair of images shows the object illuminated in a plurality of the directions is to encourage variations in the brightness of different areas of the object in the stereo pair of images caused by roughness or surface formations on the surface of the object. For example, if one of the directions is almost parallel to the propagation direction of the energy, little energy from that direction will fall onto the surface, and the surface will appear darker in the combined-direction stereo pair of images. This is based on the realization that, although shadows on an object are damaging for stereoscopy, shading (that is, not full shadows but variations in brightness) can be used as features for stereoscopic imaging of objects which exhibit few other features, and which are therefore hard to image when the object is uniformly brightly lit.

Preferably, to strengthen this effect, at least one of the single-direction stereo pairs of images can be generated when the object is illuminated from a direction which is close to the tangential direction of the object. For example, if the surface of the object exhibits very small raised or depressed formations, at least one of the directions may intercept a region of the object at an angle to the surface which is less than 30 degrees, or less than 20 degrees. However, if the surface of the object includes larger raised or depressed formations, the angle may be chosen to be higher, such as up to 80 degrees.

In principle, the energy to illuminate the object could be provided by a single energy source which moves between successive positions in which it illuminates the object in corresponding ones of the directions.

However, more typically at least three directional energy sources are provided, with each one illuminating the object from a single respective direction. It would be possible for these directional energy sources to be provided as at least three energy outlets from an illumination system in which there are fewer than three elements which generate the energy. For example, there could be a single energy generation unit (light generating unit) and a switching unit which successively transmits energy generated by the single energy generation unit to respective input ends of at least three energy transmission channels (e.g. optical fibers). The energy would be output at the other ends of the energy transmission channels, which would be at three respective spatially separately locations. Thus the output ends of the energy transmission channels would constitute respective energy sources. The light would propagate from the energy sources in different respective directions.

Although at least three illumination directions are required for photometric imaging, the number of illumination directions may be higher than this. The timing of the activation of the energy sources and energy sensor(s) may be controlled by a processor, such as the one which calculates the relative motion of the object and energy sensor(s).

Preferably, a directional energy source is provided close to at least one of the energy sensor(s). This provides "bright field" lighting, i.e. ensuring that the whole of the object which is visible to the at least one energy sensor is lit to some extent, so that there are no completely dark regions in the combined-direction stereo pair of images.

Note that the present concept reverses the conventional approach of providing a diffuse lighting source (rather than a plurality of directional energy sources) when the stereo pair of images is captured. Providing a diffuse light source has the disadvantage that an additional lighting source is required, and an additional imaging step (since while the diffuse lighting source is activated it is not possible to capture the single-direction images required for photometry). Furthermore, a diffuse lighting source would tend to produce images in which variation in the brightness of the surface is low, or even eliminated. For that reason, the present invention employs the directional energy sources to capture the stereo pair of images.

As noted above, the plurality of directional energy sources may be activated sequentially, and while each directional energy source is activated a respective stereo pair of images is captured. These single-direction stereo pairs of images are then combined computationally to give a combined-direction stereo pair of images in which the object appears to be illuminated by the plurality of directional energy sources simultaneously.

Thus, it is possible for each of the directional energy sources to be required to fire only once during the short period in which all the images used in the modelling are captured. This is important because a typical directional energy source (such as a Xenon flash) is powered by a power system which accumulates energy over a longer period (typically in a capacitor), and then uses the energy to illuminate the object during the short period. By doing this, the illumination level of the directional energy source can be made much greater than ambient light, thus increasing the accuracy of the photometric modelling. Requiring such a directional energy source to fire twice during the short period would require the power system to accumulate twice as much charge, which would increase the size and cost of the required capacitor.

There are multiple possible algorithms by which the single-direction stereo pairs of images could be combined computationally, and the algorithm can be optimized according to the imaging task. For example, a first algorithm would be to set the intensity of each pixel of each image of the combined-direction stereo pair of images to be equal to the maximum (or minimum) intensity of the corresponding pixels in the single-direction images. An alternative algorithm would be to average the single-direction stereo pairs of images (i.e. for each viewpoint, identifying corresponding pixels in the images taken from that viewpoint, and then finding the mean (or median) of the intensities of those pixels).

Optionally, a plurality of combination algorithms could be used, resulting in different respective candidate combined-direction stereo pairs of images. A quality measure could be derived for each candidate combined-direction stereo pair of images, and the candidate combined-direction stereo pair of images with the highest quality measure could be used as the combined-direction stereo pair of images which is used to form the initial 3D model.

The quality measure may for example be the maximum range of intensity along respective lines in each of the images of the stereo pair. Note that many algorithms for the matching of features in the stereo pair of images are performed by a one-dimensional algorithm considering respective lines in the stereo pair of images (typically, epipolar lines), so a quality measure which is based on a one-dimensional measurement along the same lines is intuitively likely to be preferable. Furthermore, it is computationally inexpensive.

Once the combined-direction stereo pair of images has been derived, the 3D model of the object may be reconstructed from some or all of the images, such as using the methods explained in WO 2009/122200. Specifically, an initial 3D model of the object is formed using the stereo pair of images, and this may be refined using photometric data from at least three of the images which were captured when different respective ones of the directional energy sources were illuminating the object.

The energy used is electromagnetic radiation, i.e. light. The term "light" is used in this document to include electromagnetic radiation which is not in the visible spectrum. Various forms of directional energy source may be used in embodiments of the invention. For example, a standard photographic flash, a high brightness LED cluster, or Xenon flash bulb or a 'ring flash'. It will be appreciated that the energy need not be in the visible light spectrum. One or more of the energy sources may be configured to generate light in the infrared (IR) spectrum (wavelengths from 900 nm to 1 mm) or part of the near infrared spectrum (wavelengths from 900 nm to 1100 nm). Optionally, the energy may be polarized.

Where visible-light directional energy is applied, then the energy sensors may be two or more standard digital cameras, or video cameras, or CMOS sensors and lenses appropriately mounted. In the case of other types of directional energy, sensors appropriate for the directional energy used are adopted. A discrete energy sensor may be placed at each viewpoint, or in another alternative a single sensor may be located behind a split lens or in combination with a mirror arrangement.

The energy sources and viewpoints preferably have a known positional relationship, which is typically fixed. The energy sensor(s) and energy sources may be incorporated in a portable apparatus, such as a hand-held instrument. Alternatively, the energy sensor(s) and energy sources may be incorporated in an apparatus which is mounted in a building.

The invention may be expressed as an apparatus for capturing images, including a processor for analyzing the images according to program instructions (which may be stored in non-transitory form on a tangible data storage device). Alternatively, it may be expressed as the method carried out by the apparatus.

BRIEF DESCRIPTION OF THE DRAWINGS

An embodiment of the invention will now be described for the sake of example only with reference to the following figures in which.

DETAILED DESCRIPTION OF THE EMBODIMENTS

Figure 1:
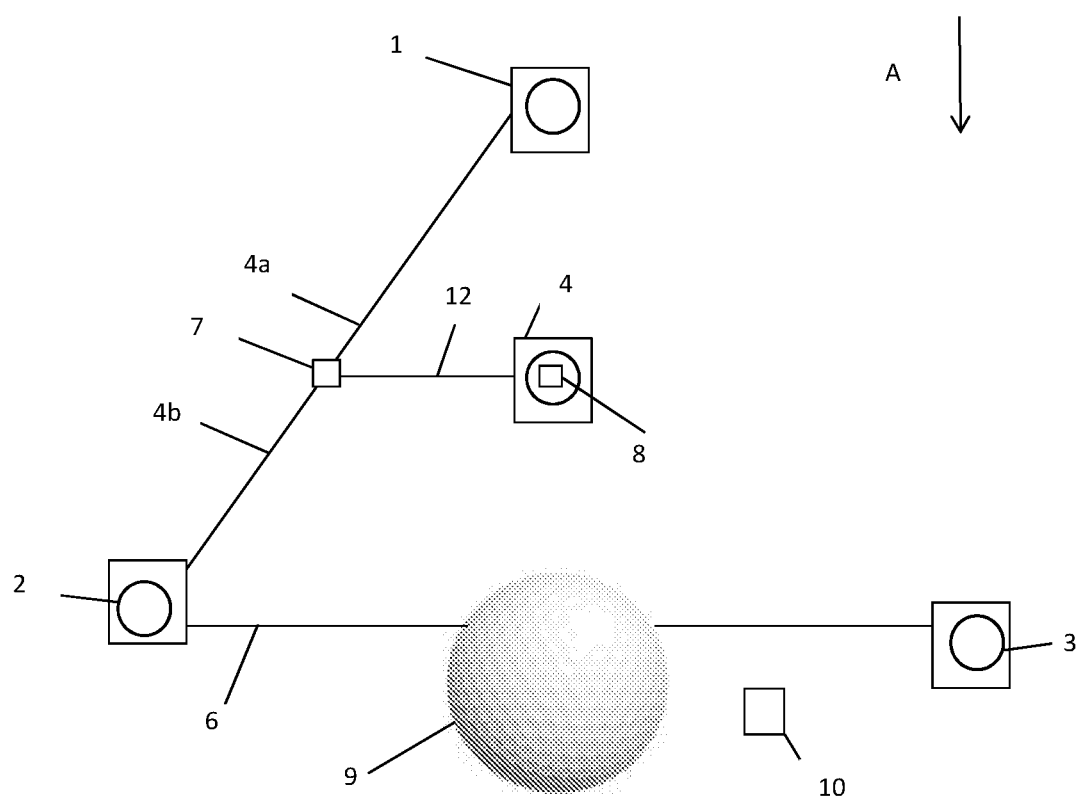
FIG. 1 shows a first schematic view of an imaging assembly for use in an embodiment of the present invention to form a 3D model of an object, including multiple image capturing devices.

Referring firstly to FIG. 1, an imaging assembly is shown which is a portion of an embodiment of the invention. The imaging assembly includes directional energy sources 1, 2, 3. It further includes energy sensors 7, 8 in form of image capturing devices. It further includes an optional additional energy source 4 which is very close to the image capturing device 8. The energy sources 2, 3 are fixedly mounted to each other by a strut 6. The image capturing device 7 is fixedly mounted to the energy source 1 by the strut 4a, to the energy source 2 by strut 4b, and to the image capturing device 8 and the optional energy source 4 by the strut 12. The exact form of the mechanical connection between the units 2, 3 and the energy source 1 is different in other forms of the invention, but it is preferable if it maintains the energy sources 1, 2, 3 and the imaging devices 7, 8 at fixed distances from each other and at fixed relative orientations. Thus, the relative positions of the energy sources 1, 2, 3, 4 and imaging devices 7, 8 are pre-known. Preferably, the energy sources 1, 2, 3 are symmetrical about (i.e. at equal angular positions around) the imaging device 8. As explained below with reference to FIG. 2, the energy sources 1, 2, 3 may be substantially co-planar, but the image capturing devices 7, 8 are spaced apart from this plane. The energy sources 1, 2, 3, 4 and image capturing devices 7, 8 may be incorporated in a portable, hand-held instrument. In addition to the assembly shown in FIG. 1, the embodiment includes a processor which is in electronic communication with the energy sources 1, 2, 3 and image capturing devices 7, 8. This is described below in detail with reference to FIG. 7.

The energy sources 1, 2, 3, 4 are each adapted to generate electromagnetic radiation, such as visible light or infra-red radiation. The energy sources 1, 2, 3, 4 and image capturing devices 7, 8, are all controlled by the processor. The output of the image capturing devices 7, 8 is transmitted to the processor.

Note that the images captured are typically color images, having a separate intensity for each pixel each of three color channels. In this case, the three channels may be treated separately in the process described below (e.g. such that the combined-direction stereo pair of images also has two channels). Alternatively, in variations of the embodiment, the three color channels could be combined together into a single channel (i.e. by at each pixel summing the intensities of the channels), or two of the channels could be discarded. In these cases, the combined-direction stereo pair of images would have only a single channel.

Each of the image capturing devices 7, 8 is arranged to capture an image of an object 9 (in FIG. 1, a monochrome golf ball with no markings) positioned in both the respective fields of view of the image capturing devices 7, 8. The image capturing devices 7, 8 are spatially separated, and preferably also arranged with converging fields of view, so the apparatus is capable of providing two separated viewpoints of the object 9, so that stereoscopic imaging of the object 9 is possible.

The case of two viewpoints is often referred to as a "stereo pair" of images, although it will be appreciated that in variations of the embodiment more than two spatially-separated image capturing devices may be provided, so that the object 9 is imaged from more than two viewpoints. This may increase the precision and/or visible range of the apparatus. The words "stereo" and "stereoscopic" as used herein are intend to encompass, in addition to the possibility of the subject being imaged from two viewpoints, the possibility of the subject being imaged from more than two viewpoints.

Suitable image capture devices for use in the invention include the ⅓-Inch CMOS Digital Image Sensor (AR0330) provided by ON Semiconductor of Arizona, US.

Figure 2:
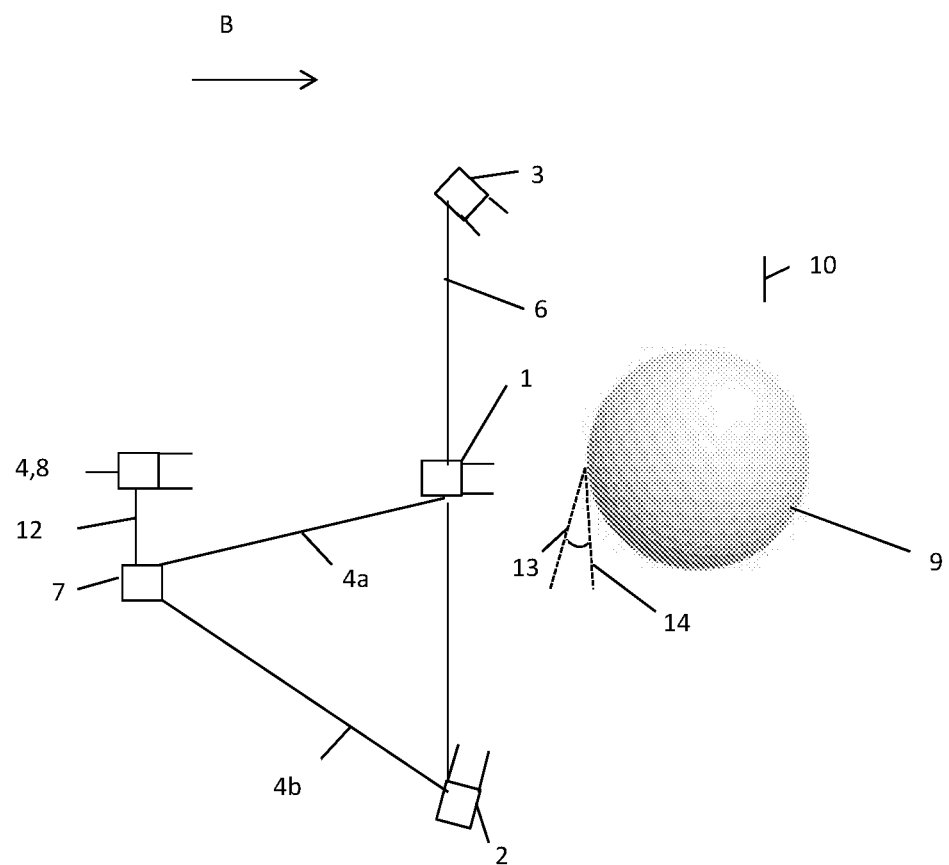
FIG. 2 is a second schematic view of the imaging assembly of FIG. 1.

FIG. 2 shows the assembly of FIG. 1 viewed in the direction which is marked as A in FIG. 1. Viewed from this direction, the energy source 4 and the imaging device 8 are same location. The energy sources 1, 2, 3 all lie substantially in a first plane, and the image capturing devices 7,8 and the energy source 4 lie in a second plane further from the object. For shallow surface features, the angle between the propagation direction 13 of the energy emitted by the energy source 2 and the tangent 14 to the point on the object 9 which intercepts the propagation direction 13 is less than 30 degrees, and preferably less than 20 degrees.

Figure 3:
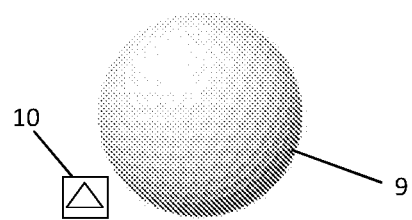
FIG. 3 is a view of the object from a direction defined in FIG. 2.

FIG. 3 shows schematically how the object 10 looks as viewed in the direction B in FIG. 2, which is perpendicular to the plane containing the image capturing devices 7, 8. This is the direction in which the image capturing devices 7, 8 face. As shown in both FIGS. 1 and 2, a localization template 10 is present in the visual field of both the image capturing devices 7, 8, and in a substantially fixed positional relationship with the object 9. The localization template 10 is useful, though not essential, for registering the images in relation to each other. Since it is in the visual field of both the image capturing devices 7, 8, it appears in all the images captured by those devices, and it is provided with a known pattern, so that the processor is able to identify it from the image, and from its position, size and orientation in any given one of the images, reference that image to a coordinate system defined in relation to the localization template 10. In this way, all images captured by the image capturing devices 7, 8 can be referenced to that coordinate system. If the object 9 moves slightly between the respective times at which any two successive images are captured, the localization template 10 will move correspondingly, so the object 9 will not have moved in the coordinate system. In variations of the embodiment in which the positional relationship of the energy sources 1, 2, 3 and image capturing devices 7, 8 is not known, it may be determined if the energy sources 1, 2, 3 illuminate the localization template 10. Note that if the object 9 is known to be stationary relative to the imaging system, the localization template 10 may be unnecessary. In other embodiments of the invention in which the object 9 may move relative to the imaging system, the images captured by image capturing devices 7, 8 may be mutually registered in other ways, such as identifying in each image landmarks of the object 9, and using these landmarks to register the images with each other.

Since the object 9 is monochrome with no marking, conventional stereo imaging may fail because it is difficult to detect features in the images of the object 9. However, because in the arrangement of FIGS. 1 and 2 the light sources 1, 2, 3 are so close to the tangent plane of the object 9 perpendicular to direction B, that the surface roughness of the object 9 causes significant variation in the brightness with which different areas of the object 9 are illuminated, and this provides features which can be used for stereoscopy.

Figure 4:
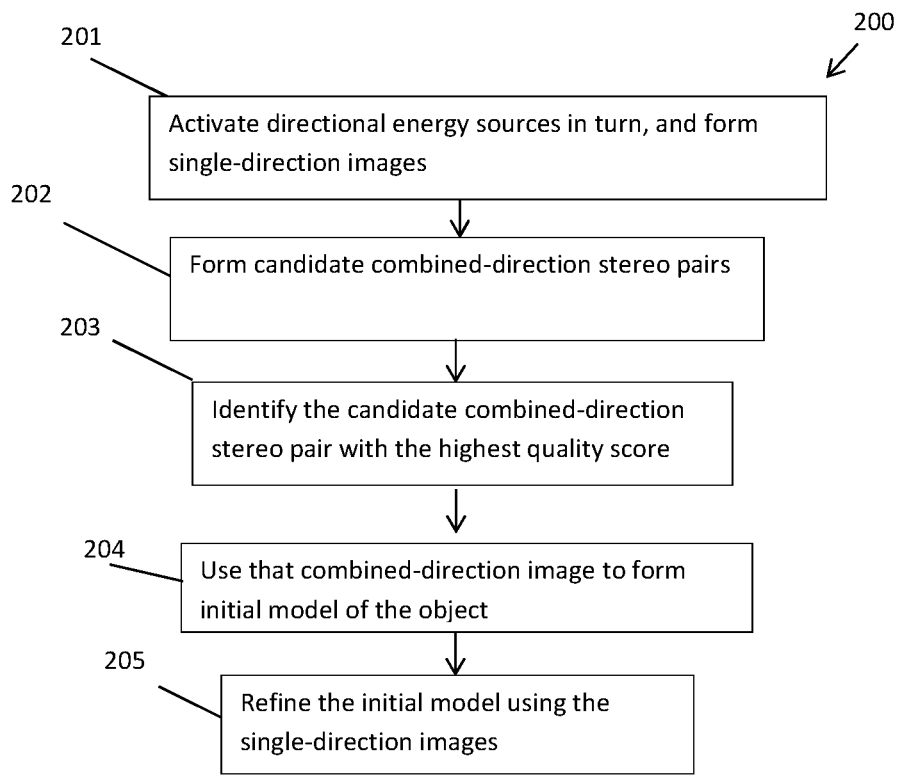
FIG. 4 is a flow diagram of a method which is an embodiment of the invention.

Turning to FIG. 4 a method 200 is shown which employs in which the system of FIG. 1. In step 201 of method 200 the processor controls the energy sources 1, 2, 3 (and energy source 4 if it is present) to fire in turn. When each of the sources 1, 2, 3, 4 is successively activated, images are captured by both the cameras 7, 8. Thus, at least three single-direction stereo pairs of images are created: at least one stereo pair of images for each of the respective energy sources 1, 2, 3, and optionally a single-direction stereo pair of images for the energy source 4. The single-direction stereo pairs of images are transmitted to the processor.

In 202, the processor uses the three single-direction stereo pairs of images to produce a plurality of combined-direction stereo pairs of images by different respective combination algorithms. For example, one candidate combined-direction stereo pair of images may be produced as the numerical mean of the at least three single-direction stereo pairs of images (i.e. the combined-direction stereo pair of images consists of a first image which has an intensity at each pixel which is the mean of the intensities of the corresponding pixels in the at least three images captured by the image capturing device 7; and a second image which has an intensity at each pixel which is the mean of the intensities of the corresponding pixels in the at least three images captured by the image capturing device 8). A second candidate combined-direction stereo pair of images may be produced consisting of two images: a first image which, at each pixel, has an intensity equal to the highest intensity of the corresponding pixels in the at least three images captured by the image capturing device 7; and a second image which, at each pixel, has an intensity equal to the highest intensity of the corresponding pixels in the at least three images captured by the image capturing device 8. A third candidate combined-direction stereo pair of images may be produced as the numerical median of the at least three single-direction stereo pairs of images (i.e. the combined-direction stereo pair of images consists of a first image which has an intensity at each pixel which is the median of the intensities of the corresponding pixels in the at least three images captured by the image capturing device 7; and a second image which has an intensity at each pixel which is the median of the intensities of the corresponding pixels in the at least three images captured by the image capturing device 8). In the case that the energy source 11 is used, so that there are four directional light sources in total, the median (i.e. the mean of the two intensities which are not at the extreme ends of the range of intensities) is often found to be the best algorithm.

In variations of the system of FIG. 1 in which there are more than two image capturing devices, such that each of the single-direction stereo pairs of images includes more than two images, step 202 would be carried out the corresponding way: producing a plurality of combined-direction stereo pairs of images which each contain more than two images, with each of those images being formed by combining single-direction images captured by a corresponding one of the energy capture devices.

In step 203, a quality score is calculated for each of the candidate combined-direction stereo pairs of images. This may be done by defining a one-dimensional line in each combined-direction image of the candidate combined-direction stereo pair of images, such as at least part of the epipolar line which passes through the centre of each image; and forming the quality score as a function of the intensities along the lines, for example as the range between the maximum intensity along the line and the minimum intensity along the line. The candidate combined-direction stereo image with the highest quality score is identified, and the other candidate combined-direction stereo images are discarded.

Note that in a variation of the method 200, in step 202 the processor uses the single-direction stereo pairs of images to produce just one combined-direction stereo pair of images (e.g. by any of the methods discussed above for combining the single-direction stereo pairs of images), and step 203 is omitted.

In step 204, the processor uses the combined-direction stereo pair of images geometrically, e.g. by the same stereoscopic algorithm employed in WO 2009/122200, to produce an initial 3D model of the object 9. This is based around known principles of optical parallax. This technique generally provides good unbiased low-frequency information (the coarse underlying shape of the surface of the object), but is noisy or lacks high frequency detail. The stereoscopic reconstruction uses optical triangulation, by geometrically correlating pairs of features in the respective stereo pair of images captured by the image capture devices 7, 8 to give the positions of each of the corresponding landmarks on the object 9 in a three-dimensional space defined based on the localization template 10. The landmarks will include any landmarks due to variations in the color of the object (e.g. marking the object 9 carried) but additionally landmarks which are due to brightness variations in the light cast by any of the directional energy sources 1, 2, 3. Thus, the stereoscopy should thus be more successful than it would have been if the object 9 had been lit by diffuse lighting at this time, or if the object had been lit by only one of the energy sources 1, 2 3, or if the energy sources 1, 2, 3 had illuminated the object 9 from directions which are closer to the normal direction to the surface of the object 9.

In step 205, the processor refines the initial model using at least one of the images of each of the single-direction stereo pairs of images, and the photometric technique employed in WO 2009/122200. The photometric reconstruction requires an approximating model of the surface material reflectivity properties. In the general case this may be modelled (at a single point on the surface) by the Bidirectional Reflectance Distribution Function (BRDF). A simplified model is typically used in order to render the problem tractable. One example is the Lambertian Cosine Law model. In this simple model the intensity of the surface as observed by the camera depends only on the quantity of incoming irradiant energy from the energy source and foreshortening effects due to surface geometry on the object. This may be expressed as:

$$I = P\rho L \cdot N \quad \text{(Eqn 1)}$$

where I represents the intensity observed by the image capture devices 7, 8 at a single point on the object, P the incoming irradiant light energy at that point, N the object-relative surface normal vector, L the normalized object-relative direction of the incoming lighting and $\rho$ the Lambertian reflectivity of the object at that point. Typically, variation in P and L is pre-known from a prior calibration step, or from knowledge of the position of the energy sources 1, 2, 3, 4, and this (plus the knowledge that N is normalized) makes it possible to recover both N and $\rho$ at each pixel. Since there are three degrees of freedom (two for N and one for $\rho$), intensity values I are needed for at least three directions L in order to uniquely determine both N and $\rho$. Note that typically only the single-direction images captured by the image capturing device 8 are used in the photometry.

This is why three energy sources 1, 2, 3 are provided. The optional additional energy source 4 provides redundancy. All areas of the object will be bright in the single-direction image for the energy source 4 captured by the image capturing device 8. Thus, if any point of the object is in shadow in one of the single-direction images for the sources 1, 2, 3, photometry for that point is performed using the single-direction images for the other ones of the single-direction images for the sources 1, 2, 3, and the single-direction image for the source 4.

An advantage of method 200 is that each of the energy sources 1, 2, 3 (and energy source 4, if present) only has to be activated for as long as it takes the image capture devices 7, 8 to capture one image. It is highly desirable if the entire image capture process is completed within a short period (e.g. under 0.2 s or under 0.1 s), and for the energy sources 1, 2, 3 to produce a much brighter light than ambient light to improve resolution, so this normally implies that the power source for the energy sources 1, 2, 3, 4 accumulates energy in a capacitor for use to power the energy sources 1, 2, 3, 4 during the short period, e.g. as a flash. Requiring any of the energy sources 1, 2, 3, 4 to be activated twice during the short period would require the power supply for the energy sources to deliver more power during the short period, which would in turn increase the cost and/or size of the capacitor required.

Figure 5:
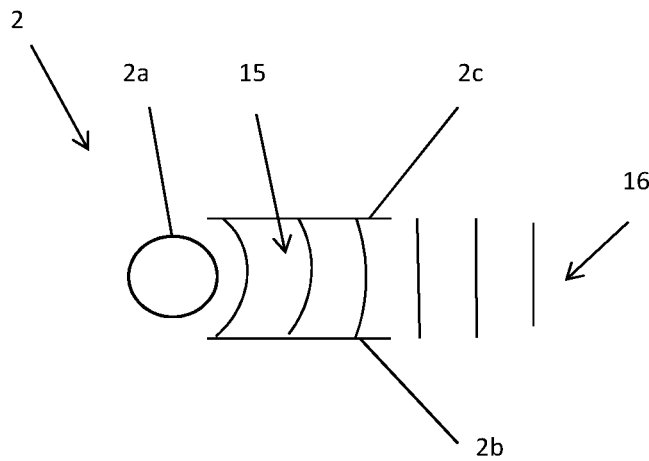
FIG. 5 shows an arrangement used in the embodiment of FIG. 1 for increasing the directionality of emitted light in the embodiment.

Turning to FIG. 5, a possible structure for the energy source 2 is illustrated (the other energy sources 1, 3 and 4 would typically have the same structure). It includes an electromagnetic energy generation element 2a which generates light waves 15 propagating generally to the right in FIG. 5. "Barn doors" (i.e. energy absorbing surfaces) 2b and 2c absorb any of the light which does not propagate in the direction which is horizontal in FIG. 5, leading to highly directional light 16. This highly directional light is useful both to ensure that the direction L in Eqn. (1) is well-defined. The barn doors 2b, 2c may be plates, or may be parts of a hollow cylindrical structure encircling the light beam.

Figure 6:
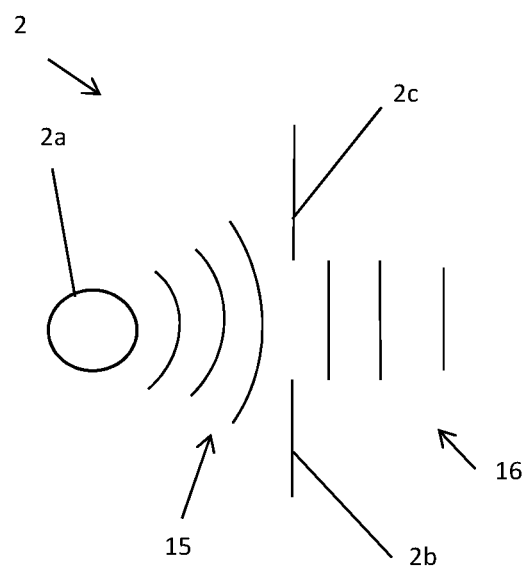
FIG. 6 shows a variation of the arrangement of FIG. 4.

Turning to FIG. 6, a second possible structure for the energy source 2 is illustrated (the other energy sources 1 and 3 would typically have the same structure). Elements having the same meaning in FIG. 5 are given the same reference numerals. In this case, the "barn doors" 2b and 2c are located to produce an aperture between them though which a portion of the energy generated by the energy generation element 2a can propagate. The barn doors 2b, 2c may in fact be portions of a unitary structure defining a circular aperture through which the light beam passes. In FIG. 6, unlike in FIG. 5, it is not critical whether the barn doors 2b, 2c absorb energy incident on them, or alternatively reflect it back towards the left direction in FIG. 6. In either case, the only light which will reach the object 7 is the highly directional light 16 which passes through the aperture.

Figure 7:
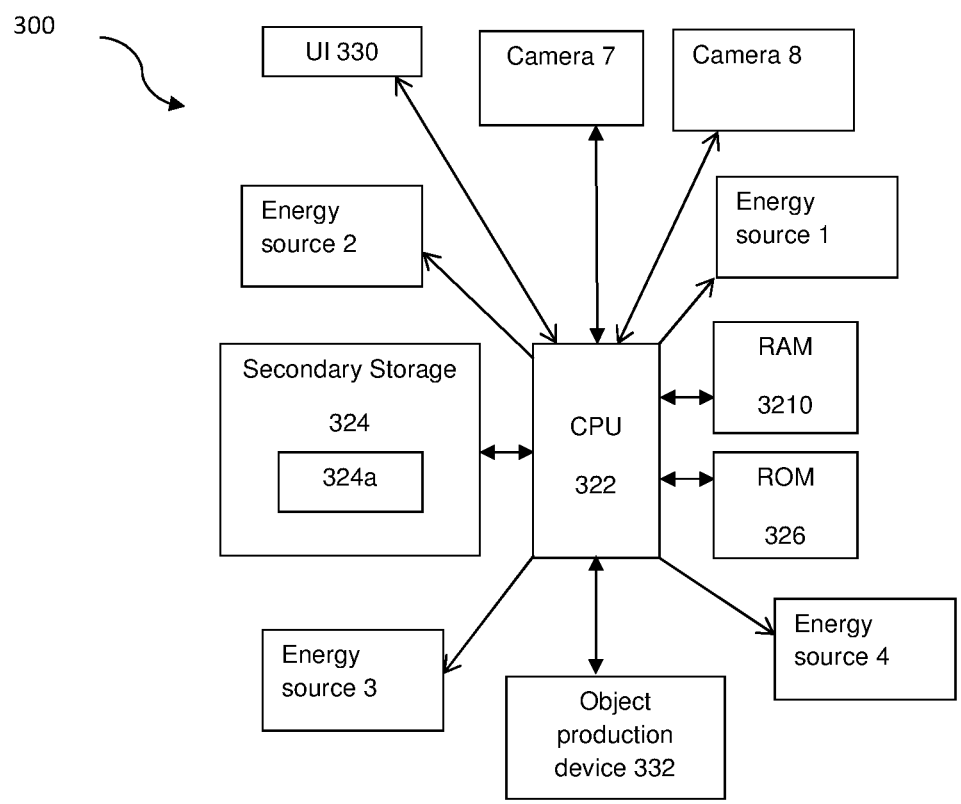
FIG. 7 illustrates an embodiment of the invention incorporating the imaging assembly of FIG. 1 and a processor.

FIG. 7 is a block diagram showing a technical architecture of the overall system 300 for performing the method.

The technical architecture includes a processor 322 (which may be referred to as a central processor unit or CPU) that is in communication with the cameras 7, 8, for controlling when they capture images and receiving the images. The processor 322 is further in communication with, and able to control the energy sources 1, 2, 3, 4.

The processor 322 is also in communication with memory devices including secondary storage 324 (such as disk drives or memory cards), read only memory (ROM) 326, random access memory (RAM) 3210. The processor 322 may be implemented as one or more CPU chips.

The system 300 includes a user interface (UI) 330 for controlling the processor 322. The UI 330 may comprise a touch screen, keyboard, keypad or other known input device. If the UI 330 comprises a touch screen, the processor 322 is operative to generate an image on the touch screen.

Alternatively, the system may include a separate screen (not shown) for displaying images under the control of the processor 322.

The system 300 optionally further includes a unit 332 for forming 3D objects designed by the processor 322; for example the unit 332 may take the form of a 3D printer. Alternatively, the system 300 may include a network interface for transmitting instructions for production of the objects to an external production device.

The secondary storage 324 is typically comprised of a memory card or other storage device and is used for non-volatile storage of data and as an over-flow data storage device if RAM 3210 is not large enough to hold all working data. Secondary storage 324 may be used to store programs which are loaded into RAM 3210 when such programs are selected for execution.

In this embodiment, the secondary storage 324 has an order generation component 324a, comprising non-transitory instructions operative by the processor 322 to perform various operations of the method of the present disclosure. The ROM 326 is used to store instructions and perhaps data which are read during program execution. The secondary storage 324, the RAM 3210, and/or the ROM 326 may be referred to in some contexts as computer readable storage media and/or non-transitory computer readable media.

The processor 322 executes instructions, codes, computer programs, scripts which it accesses from hard disk, floppy disk, optical disk (these various disk based systems may all be considered secondary storage 324), flash drive, ROM 326, RAM 3210, or the network connectivity devices 332. While only one processor 322 is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope of the attached claims.

The invention claimed is:

1. An apparatus for computing a three-dimensional (3D) model of an object, comprising:
at least one directional energy source arranged to directionally illuminate the object from at least three directions;
one or more energy sensors arranged to capture images of the object from multiple viewpoints;
a processor arranged to receive images captured by the energy sensors, and control the at least one energy source and the energy sensors;
the processor being arranged to control the at least one energy source and one or more energy sensors to capture for each energy sensor, and for each said direction, at least one corresponding single-direction image which shows the object illuminated in the said direction;
the processor further being arranged to combine corresponding ones of said single-direction images computationally to produce combined-direction images for each of the viewpoints, the combined-direction images each showing the object illuminated in a plurality of the directions, the processor being arranged to combine the single-direction images by:
(i) using the single-direction images from each of the viewpoints, to produce, for each of a plurality of combination algorithms, a respective set of candidate combined-direction images from each of the viewpoints;
(ii) obtaining a quality measure for each set of candidate combined-direction images;
(iii) identifying the set of candidate combined-direction images for which the quality measure is highest; and
(iv) using the identified set of candidate combined-direction image as the combined-direction images;
the processor further being arranged:
to analyze the combined-direction images stereoscopically to obtain an initial model of the object;
to obtain photometric data from the single-direction images; and
to refine the initial model using the photometric data.

2. An apparatus according to claim 1 in which the combined-direction images have an intensity, for each viewpoint and in each pixel, which is a function of the respective intensities of the respective corresponding pixels of the single-direction images taken from the same viewpoint.

3. An apparatus according to claim 2 in which the function is selected from the group comprising:
the mean of the intensities;
the maximum of the intensities; and
the median of the intensities.

4. An apparatus according to claim 1 comprising at least one directional energy source located proximate to one of the energy sensors.

5. An apparatus according to claim 1 in which each directional energy source includes one or more energy generation elements and one or more collimating elements for collimating energy generated by the energy generation elements.

6. A method for computing a three-dimensional (3D) model of an object using one or more energy sensors arranged to capture images of the object from multiple viewpoints, the method comprising:
directionally illuminating the object from at least three directions, capturing for each energy sensor at least one corresponding single-direction image which shows the object illuminated in the corresponding direction;
computationally combining corresponding ones of said single-direction images, to producing for each energy sensor combined-direction images, the combined-direction images each showing the object illuminated in the plurality of directions, said combining the single-direction images being performed by:
(i) using the single-direction images from each of the viewpoints, to produce, for each of a plurality of combination algorithms, a respective set of candidate combined-direction images from each of the viewpoints;
(ii) obtaining a quality measure for each set of candidate combined-direction images;
(iii) identifying the set of candidate combined-direction images for which the quality measure is highest; and
(iv) using the identified set of candidate combined-direction images as the combined-direction images;
analyzing the combined-direction images stereoscopically to obtain an initial model of the object;
obtaining photometric data from the single-direction images; and
refining the initial model using the photometric data.

7. A method according to claim 6 in which the combined-direction images have an intensity, for each viewpoint and in each pixel, which is a function of the respective intensities of the respective corresponding pixels of the single-direction images captured from the same viewpoint.

8. A method according to claim 7 in which the function is selected from the group comprising:
   the mean of the intensities;
   the maximum of the intensities; and
   the median of the intensities.

9. A method according to claim 6 in which each directional energy source includes one or more energy generation elements and one or more collimating elements for collimating energy generated by the energy generation elements.

10. A method according to claim 6 comprising positioning at least one of the energy sources relative to the object with the energy generated by the at least one energy source incident on at least one point the object at an angle to a tangent of the object at that point which is no more than 20 degrees.

\* \* \* \* \*